United States Patent
Nawa

(10) Patent No.: US 6,556,385 B2
(45) Date of Patent: Apr. 29, 2003

(54) HEAD SENDING MECHANISM, BACKLASH ELIMINATING MECHANISM THEREFOR AND ACTUATOR ASSEMBLY

(75) Inventor: Ikuichiro Nawa, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/007,176

(22) Filed: Oct. 23, 2001

(65) Prior Publication Data

US 2002/0048122 A1 Apr. 25, 2002

(30) Foreign Application Priority Data

Oct. 24, 2000 (JP) ...................................... 2000-323757

(51) Int. Cl.⁷ ................................................. G11B 5/55
(52) U.S. Cl. ................................................. 360/261.3
(58) Field of Search .......................... 360/261.3, 261.1, 360/266.2, 267.3, 291.2, 241.3; 369/216, 219, 223

(56) References Cited

U.S. PATENT DOCUMENTS

| 5,303,606 A | * | 4/1994 | Kokinda ...................... 411/304 |
| 5,414,585 A | | 5/1995 | Saliba |
| 5,793,574 A | | 8/1998 | Cranson et al. |
| 5,839,321 A | * | 11/1998 | Siemons ...................... 267/172 |
| 5,857,634 A | | 1/1999 | Hertrich |
| 5,862,014 A | | 1/1999 | Nute |
| 6,058,098 A | * | 5/2000 | Kato ............................ 369/219 |
| 6,241,171 B1 | | 6/2001 | Gaboury |

FOREIGN PATENT DOCUMENTS

| JP | 2000-100025 A | 4/2000 |
| JP | 2000-100116 A | 4/2000 |
| JP | 2000-149491 A | 5/2000 |
| WO | WO 86/07295 A1 | 12/1986 |
| WO | WO 86/07471 A1 | 12/1986 |

* cited by examiner

Primary Examiner—William Korzuch
Assistant Examiner—Jennifer M Dolan
(74) Attorney, Agent, or Firm—Frishauf, Holtz, Goodman & Chick, P.C.

(57) ABSTRACT

A backlash eliminating mechanism is used in a head sending mechanism for sending head assembly mounted on a head lift up and down along a relation axis of a lead screw. The backlash eliminating mechanism comprises a pressing means for always pressing the head lift along the rotation axis of the lead screw. The pressing means comprises a preload bushing located in a middle space of the head lift and has a internal thread engaging an external thread of the lead screw extending through the middle space. A compressed coil spring is located between the head lift and the preload bushing in the middle space of the head lift and presses the head lift against the preload bushing along the rotation axis of the lead screw.

13 Claims, 12 Drawing Sheets

HEAD SENDING MECHANISM, BACKLASH ELIMINATING MECHANISM THEREFOR AND ACTUATOR ASSEMBLY

BACKGROUND OF THE INVENTION

This invention relates to a linear tape storage system represented by DLT (digital liner tape) or LTO (linear tape open) and, in particular, to a magnetic tape head actuator assembly (or a head sending mechanism) and a backlash eliminating mechanism (or a wobble prevention mechanism) thereof.

Linear tape storage systems (magnetic recording/reproducing apparatus) of the type described are developed as "backup" systems for memory devices (e.g. hard disks) of computer systems and various types of the linear tape storage systems have been proposed in prior art. For example, a digital linear tape drive serving as the DLT is disclosed in U.S. Pat. No. 5,862,014 to Nute, entitled: "Multi-Channel Magnetic Tape Head Module Including Flex Circuit" or the like.

The digital linear tape drive (which may be merely called "driving apparatus", "tape drive", or "drive") is for receiving a tape cartridge (which may be merely called "cartridge") having a single reel (a supply reel) and contains a take-up reel therein. When the tape cartridge is installed in the driving apparatus, a magnetic tape is pulled out of the tape cartridge and then is wound by the take-up reel through a head guide assembly (HGA). The head guide assembly is for guiding the magnetic tape (which may be merely called "tape") pulled out of the tape cartridge to a magnetic head. The magnetic head exchanges information between the tape and the magnetic head. The head guide assembly generally comprises a boomerang-shaped aluminum plate and six large guide rollers each using a bearing.

In addition, the head guide assembly is also called a tape guide assembly which is disclosed, for example, in U.S. Pat. No. 5,414,585 to Saliba, entitled: "Rotating Tape Edge Guide". Furthermore, an example of the guide roller is disclosed in Japanese Unexamined Patent Publication No. 2000-100025 (JP 2000-100025 A).

The tape drive is generally comprised of a rectangular housing that has a common base as described, for example, in U.S. Pat. No. 5,793,574, entitled: "Tape Head Actuator Assembly Having A Shock Suppression Sleeve" to Cranson et al. The base has two spindle motors (reel motors). The first spindle motor has a spool (or a take-up reel) permanently mounted on the base and the spool is dimensioned to accept a relatively high speed streaming magnetic tape. The second spindle motor (reel motor) is adapted to accept a removable tape cartridge. The removable tape cartridge is manually or automatically inserted into the drive via a slot formed on the drive's housing. Upon insertion of the tape cartridge into the slot, the cartridge engages with the second spindle motor (reel motor). Prior to rotation of the first and the second spindle motors, the tape cartridge is connected to the permanently mounted spool (the take-up reel) by means of a mechanical buckling mechanism. A number of rollers (guide rollers) positioned, as intermediates, between the tape cartridge and the permanent spool guide the magnetic tape as it traverses at relatively high speeds back and forth between the tape cartridge and the permanently mounted spool.

In the digital linear tape drive having such a structure, an apparatus for pulling the tape from the supply reel to the take-up reel is required. Such as a pulling apparatus is disclosed, for example, in International Publication No. WO 86/07471. According to WO 86/07471, take up leader means (a first tape leader) is coupled to the take-up reel while supply tape leader means (a second tape leader) is connected to the tape on the supply reel. The first tape leader has one end formed into a mushroom like tab. The second tape leader has a locking aperture. The tab is engaged into the locking aperture.

Furthermore, a mechanism for joining the first tape leader with the second tape leader is required. Such a joining mechanism is disclosed, for example, in International Publication No. WO 86/07295.

In addition, Japanese Unexamined Patent Publication No. 2000-100116 (JP 2000-100116 A) discloses a structure of leader tape engaging part which can engage an end part of a leader tape (the second tape leader) to a tape end hooking part in a tape cartridge without requiring a tab projected in the side of the leader tape.

U.S. Pat. No. 5,857,634, entitled: "Take-up Reel Lock" to Hertrich discloses a locking system for preventing a take-up reel of a tape drive from rotating when a tape cartridge is not inserted to the drive.

On the other hand, an example of the tape cartridge installed in the digital linear tape drive is disclosed in Japanese Unexamined Patent Publication No. 2000-149491 (JP 2000-149491 A).

In addition, U.S. Pat. No. 6,241,171, entitled: "Leaderless Tape Drive" to Gaboury discloses a tape drive wherein a tape leader from a tape cartridge is urged through a tape path, into a take-up reel, and secured therein without the use of a buckling mechanism or a take-up leader.

In addition, the tape drive further comprises a magnetic tape head actuator assembly which is located between a take-up spool and a tape cartridge on a tape path defined by a plurality of rollers. During operation, a magnetic tape flows forward and backward between the take-up spool and the tape cartridge and is closely adjacent to the tape head actuator assembly while the magnetic tape flows on the defined tape path. An example of such as a magnetic tape head actuator assembly is disclosed in the above-mentioned U.S. Pat. No. 5,793,574.

The magnetic tape head actuator assembly comprises a tape head assembly and a head sending mechanism. The tape head assembly comprises a magnetic head and a head holder for holding the magnetic head. On the other hand, the head sending mechanism comprises a lead screw having a rotation axis and an external thread, a split nut having an internal thread engaging with the external thread of the lead screw, and a head lift for engaging the split nut and for holding the tape head assembly.

The magnetic tape head actuator assembly is mounted on a chassis of the tape drive. In this situation, rotation of the lead screw moves both of the split nut and the head lift up and down along the rotation axis of the lead screw and thereby moves the head assembly up and down.

To eliminate backlash between the lead screw and the split nut, an annular channel is formed at a peripheral surface of the split nut and a doughnut spring is located in the annular channel. The doughnut spring is a special coil spring formed into a doughnut shape. The doughnut spring elastically changes the shape of the split nut so as to press the split nut from the outside into the inside against the lead screw.

As mentioned above, the combination of the split nut and the doughnut spring is used as a backlash eliminating mechanism (or a wobble prevention mechanism) in the conventional magnetic tape head actuator assembly.

However, the split nut and the doughnut spring are expensive because of their special shapes (or structures). Furthermore, the split nut has elasticity with a manufacturing variation and the same is true for the doughnut spring. Accordingly, it is difficult to obtain fixed pressing power from the split nut against the lead screw.

In addition, the conventional head sending mechanism comprises a bearing for the lead screw and a guide for preventing the head lift from rotating which are apart from the split nut. Thus, the head sending mechanism is expensive and it is difficult to mount the head sending mechanism on the chassis of the tape drive.

SUMMARY OF THE INVENTION

It is therefore an object of this invention to provide a head sending mechanism (or an actuator assembly) with a backlash eliminating mechanism which can substantially eliminate backlash of the head sending mechanism by means of inexpensive structure (or by using inexpensive parts).

It is another object of this invention to provide a head sending mechanism (or an actuator assembly) with a backlash eliminating mechanism which can obtain fixed pressing power.

It is still another object of this invention to provide a head sending mechanism (or an actuator assembly) which is inexpensive.

It is yet still another object of this invention to provide a head sending mechanism (or an actuator assembly) capable of reducing the number of assembling processes.

Other object of this invention will become clear as the description proceeds.

According to the aspect of this invention, a head sending mechanism is for sending a head assembly up and down along a predetermined axis extending in an up and down direction. The head sending mechanism comprises a lead screw with an external thread having a rotation axis corresponding to the predetermined axis. A head lift on which the head assembly is mounted provides a through hole from a lower side to an upper side thereof in the up and down direction and freely receives the lead screw. The head lift further provides a middle space which is open to the outside of the head lift and partly coincides with the through hole at the middle thereof in the up and down direction. A head guide is fixed at the lower side of the head lift and has a first internal thread for engaging with the external thread of the lead screw. The head guide moves the head lift up and down along the predetermined axis according to rotation of the lead screw around the rotation axis. A preload bushing is located in the middle space of the head lift so as to be out of contact with the head lift in the up and down direction and not to rotate around the rotation axis. The preload bushing has a second internal thread for engaging with the external thread of the lead screw. A compressed coil spring is located between the head lift and the preload bushing in the middle space of the head lift and presses the head lift against the preload bushing along the predetermined axis.

According to another aspect of this invention, a backlash eliminating mechanism is for use in a head sending mechanism for sending a head assembly up and down along a predetermined axis extending in an up and down direction. The head sending mechanism comprises a lead screw with an external thread having a rotation axis corresponding to the predetermined axis. A head lift on which the head assembly is mounted provides a through hole from a lower side to an upper side thereof in the up and down direction and freely receives the lead screw. An up-down moving member is fixed at the lower side of the head lift and has a first internal thread for engaging with the external thread of the lead screw. The up-down moving member moves the head lift up and down along the predetermined axis according to rotation of the lead screw around the rotation axis. The backlash eliminating mechanism comprises a pressing means which is related to both of the lead screw and the head lift and always presses the head lift in a direction along the predetermined axis.

In the backlash eliminating mechanism, the head lift further provides a middle space which is open to the outside of the head lift and partly coincides with the through hole at the middle thereof in the up and down direction. The pressing means comprises a preload bushing located in the middle space of the head lift so as to be out of contact with the head lift in the up and down direction and not to rotate around said rotation axis. The preload bushing has a second internal thread for engaging with the external thread of the lead screw. A compressed coil spring is located between the head lift and the preload bushing in the middle space of the head lift and presses the head lift against the preload bushing along the predetermined axis.

According to still another aspect of this invention, an actuator assembly is for moving a mounted body along a predetermined axis in an up and down direction by rotating a lead screw with an external thread. The lead screw has a rotating axis corresponding to the predetermined axis. The actuator assembly comprises a mounting member on which the mounted body is mounted. The mounting member provides a through hole from a lower side and an upper side thereof in the up and down direction and freely receives the lead screw. A moving member is fixed at the lower side of the mounting member and has a first internal thread for engaging with the external thread of the lead screw to move the mounting member up and down along the predetermined axis according to rotation of the lead screw around the rotation axis. A backlash eliminating mechanism is related to both of the lead screw and the mounting member and always presses the mounting member in a direction along the predetermined axis.

In the actuator assembly, the mounting member further provides an middle space which is open to the outside of the mounting member and partly coincides with the through hole at the middle thereof in the up and down direction. The backlash eliminating mechanism comprises a preload bushing located in the middle space of the mounting member so as to be out of contact with the mounting member in the up and down direction and not to rotate around the rotation axis. The preload bushing has a second internal thread for engaging with the external thread of the lead screw. A compressed coil spring is located between the head lift and the preload bushing in the middle space of the mounting member and presses the mounting member against the preload bushing along the predetermined axis.

DESCRIPTION OF THE PREFERRED EMBODIMENT

Figure 1:
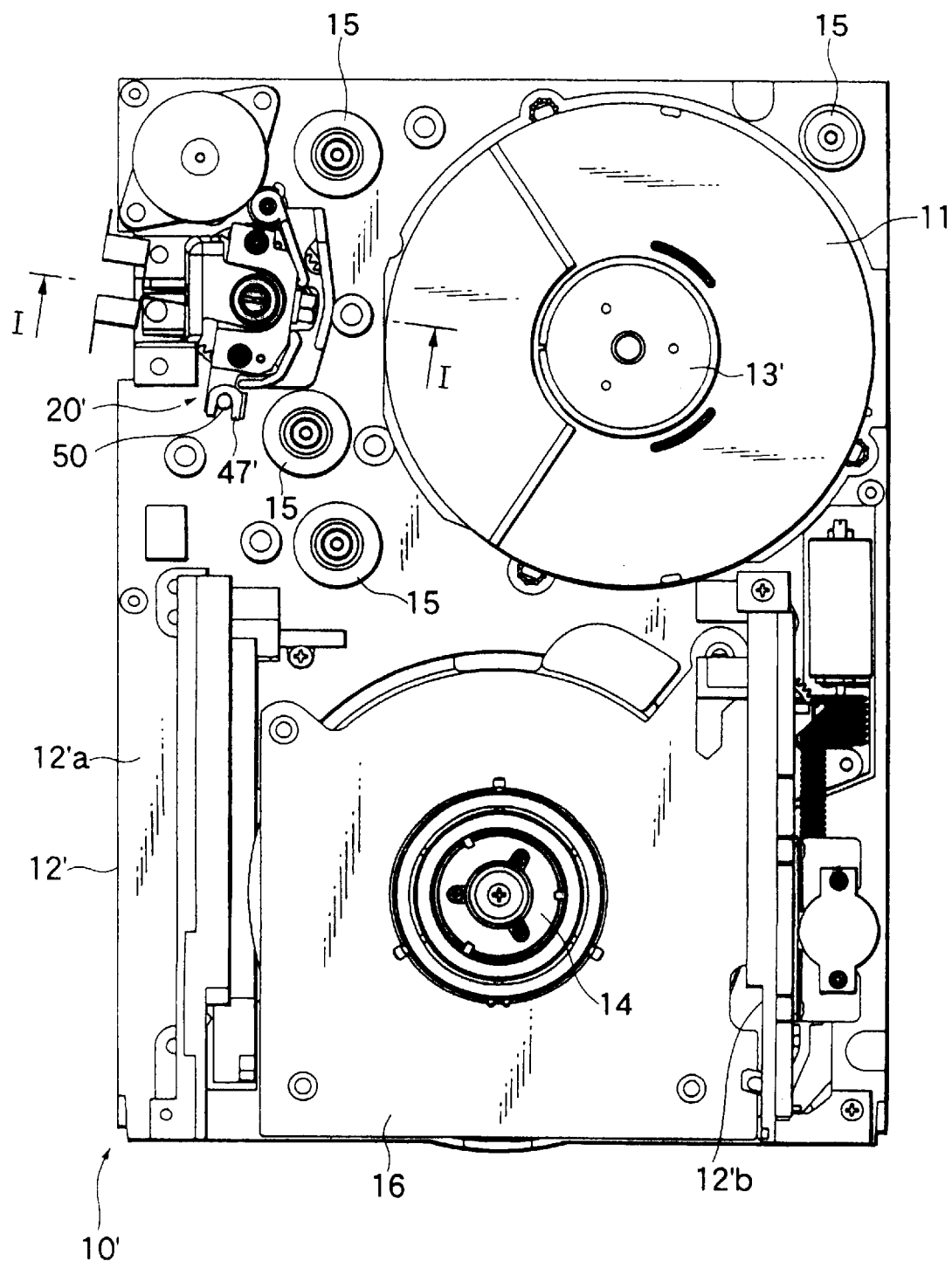
FIG. 1 is a plan view showing the conventional tape drive from which a top cover is removed.

Referring to FIG. 1, a conventional tape drive including a conventional magnetic tape head actuator assembly will be described at first in order to facilitate an understanding of the present invention. FIG. 1 is a plan view showing the conventional tape drive 10' from which a top cover is removed.

The tape drive 10' is for receiving a tape cartridge (not shown) and contains a take-up reel 11 therein. The take-up reel 11 may be called a spool. The tape drive 10' comprises a rectangular parallelepiped housing (or chassis) 12' having a common base 12'a. First and second spindle motors (or reel motors) 13' and 14 are mounted on the base 12'a. The spool (or the take-up reel) 11 is permanently fixed to the first spindle motor 13'. The spool 11 has dimensions designed to accept a relatively high speed streaming magnetic tape (not shown). The second spindle motor (reel motor) 14 is adapted to accept a removable tape cartridge. The removable tape cartridge is manually or automatically inserted into the drive 10' along a direction shown by an arrow A via a slot 12'b formed on the housing 12' of the drive 10'.

Upon insertion of the tape cartridge into the slot 12'b, the cartridge engages with the second spindle motor (reel motor) 14. Prior to rotation of the first and the second spindle motors 13' and 14, the tape cartridge is connected to the permanently mounted spool (the take-up reel) 11 by means of a mechanical buckling mechanism (not shown). A number of rollers (guide rollers) 15 positioned, as intermediates, between the tape cartridge and the permanent spool 11 guide the magnetic tape as it traverses at relatively high speeds back and forth between the tape cartridge and the permanently mounted spool 11.

In addition, the housing (the chassis) 12' comprises an aluminum die cast, which is non-magnetic material. Accordingly, the housing 12' can not block magnetic flux from magnets (not shown) of the second spindle motor 14. Therefore, the second spindle motor 14 is covered by a plate 16 made of magnetic material of an iron system to block the magnetic flux leaking out from the second spindle motor 14.

The tape drive 10' further comprises a magnetic tape head actuator assembly (which may be merely called an actuator assembly) 20' which is located between a take-up spool 11 and a tape cartridge on a tape path defined by the plurality of rollers 15. During operation, a magnetic tape flows forward and backward between the take-up spool 11 and the tape cartridge and is closely adjacent to the magnetic tape head actuator assembly 20' while the magnetic tape flows on the defined tape path.

Figure 2:
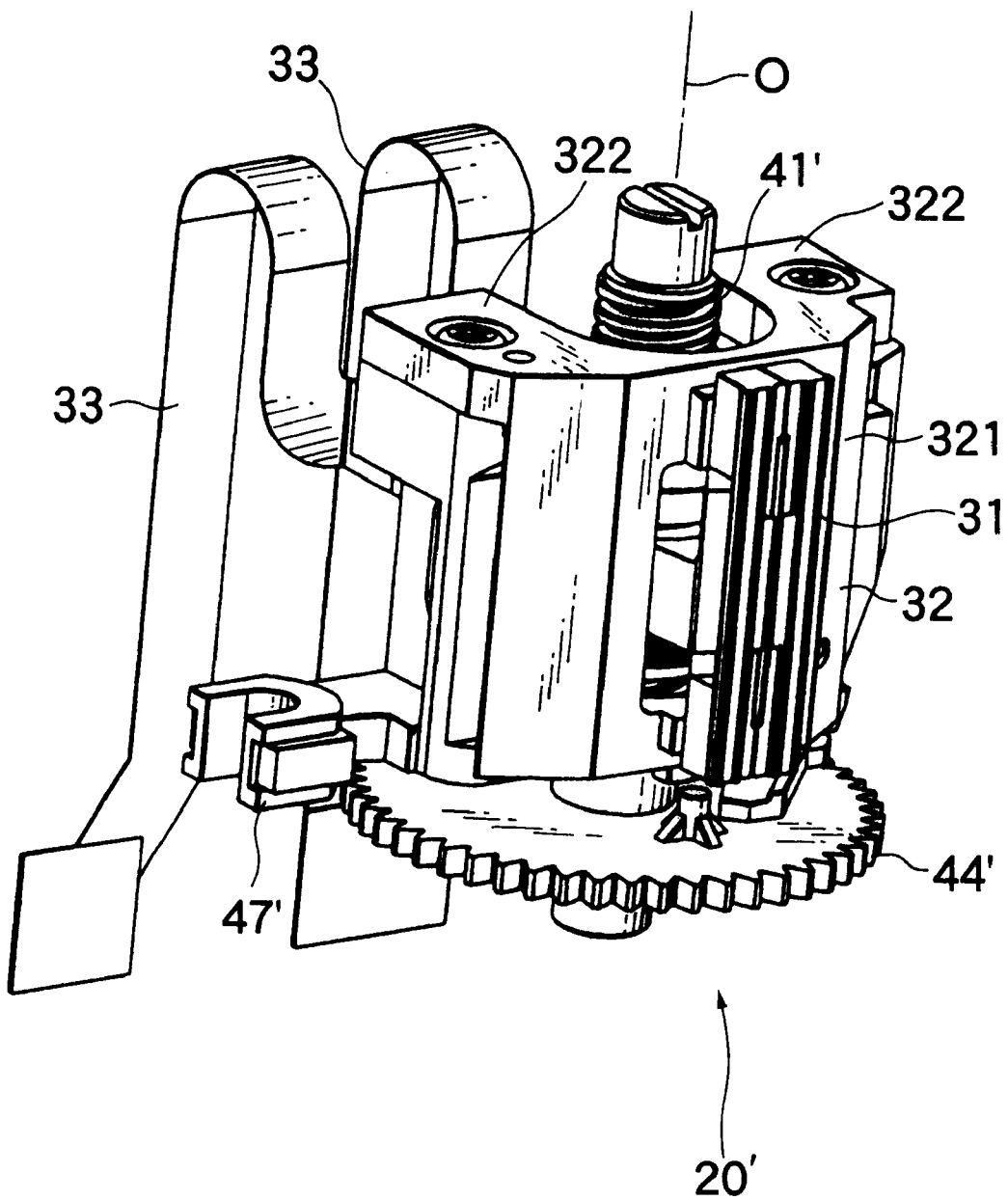
FIG. 2 is a perspective view showing an appearance of a conventional magnetic tape head actuator assembly used in the tape drive of FIG. 1.
Figure 3:
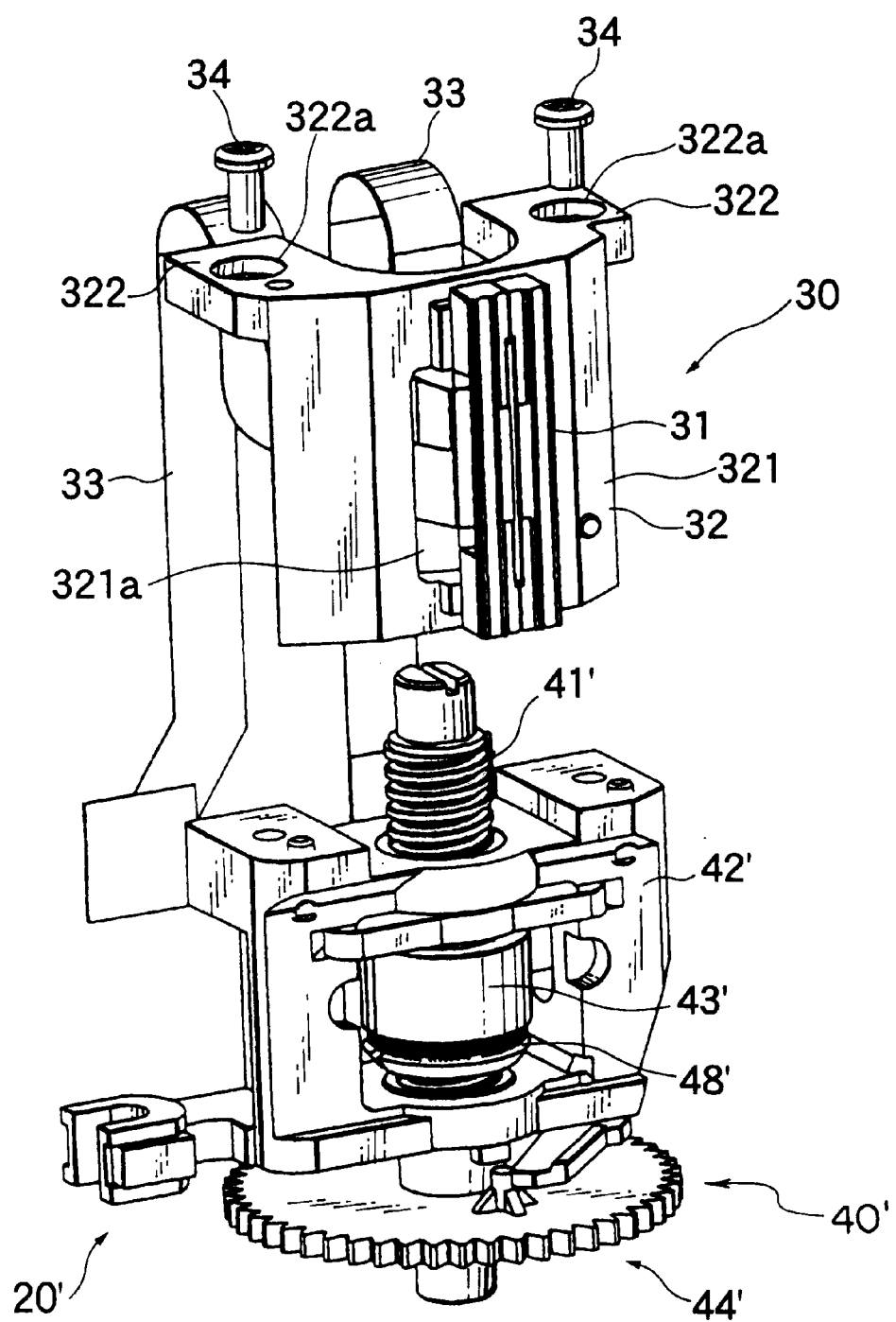
FIG. 3 is an exploded perspective view showing the magnetic tape head actuator assembly of FIG. 2 in a state where a tape head assembly and a head sending mechanism are apart from each other.
Figure 4:
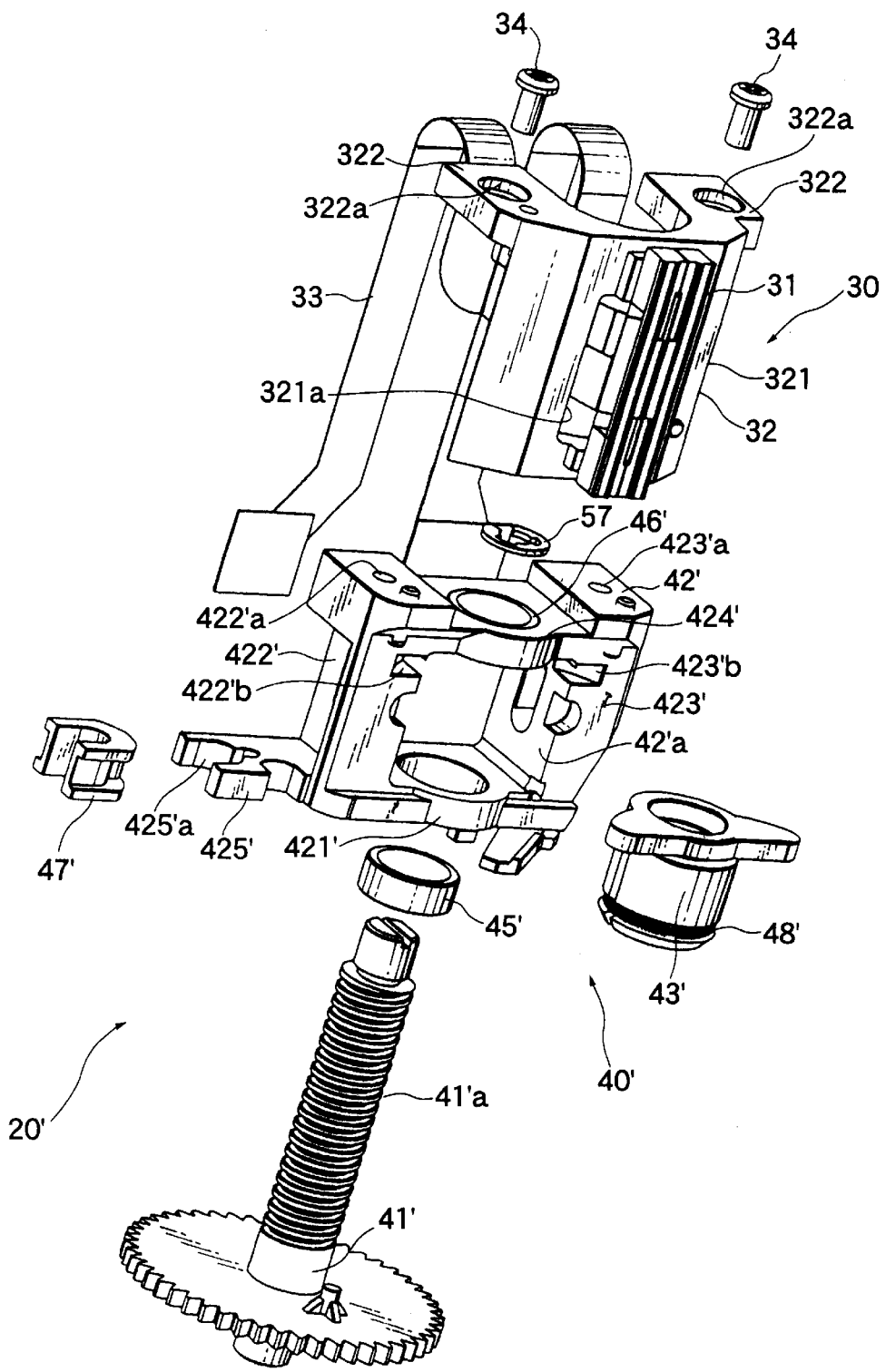
FIG. 4 is an exploded perspective view showing the magnetic tape head actuator assembly of FIG. 3 in a state where the head sending mechanism is partly taken apart.
Figure 5:
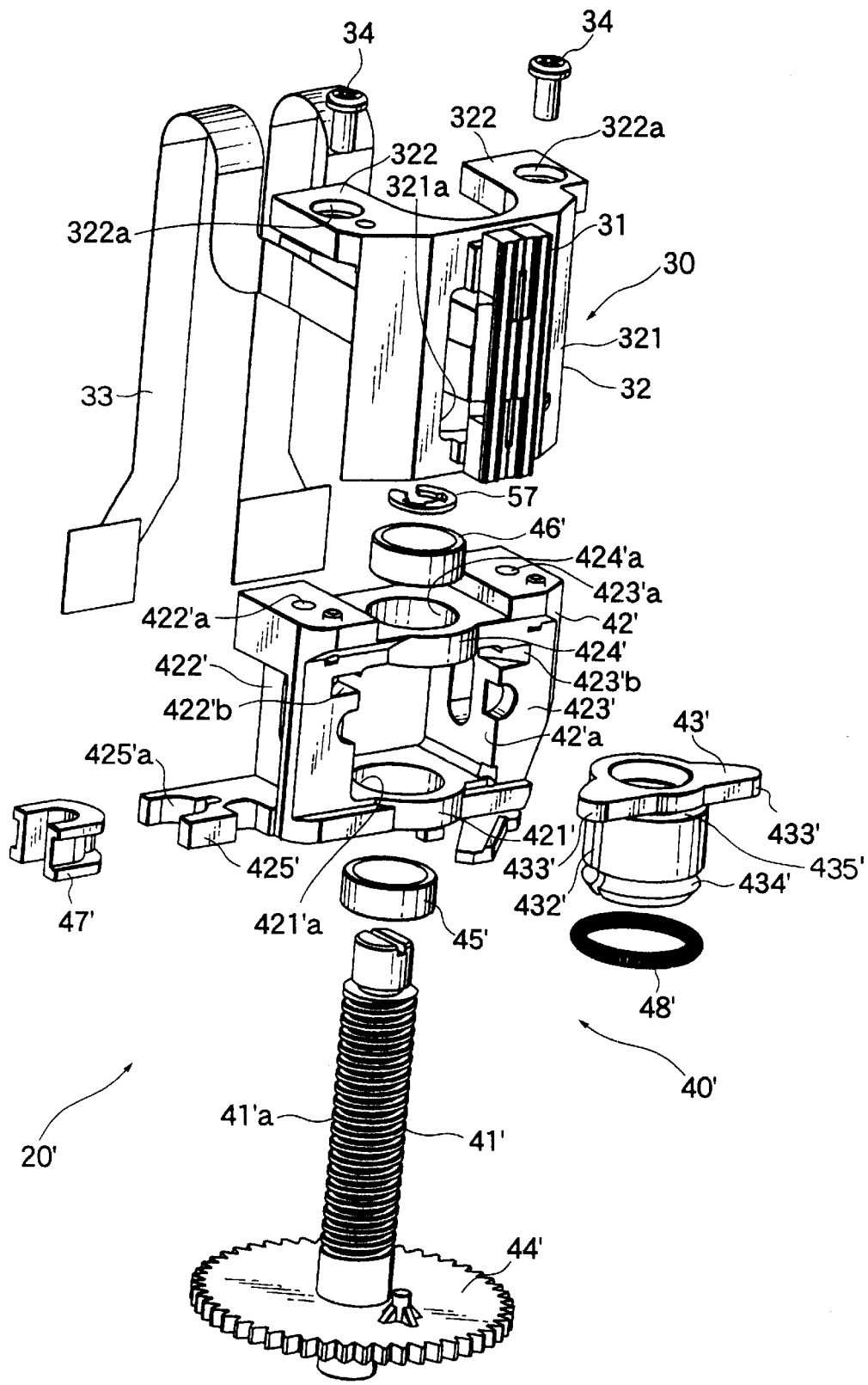
FIG. 5 is an exploded perspective view showing the magnetic tape head actuator assembly of FIG. 4 in a state where the head sending mechanism is completely taken apart.
Figure 6:
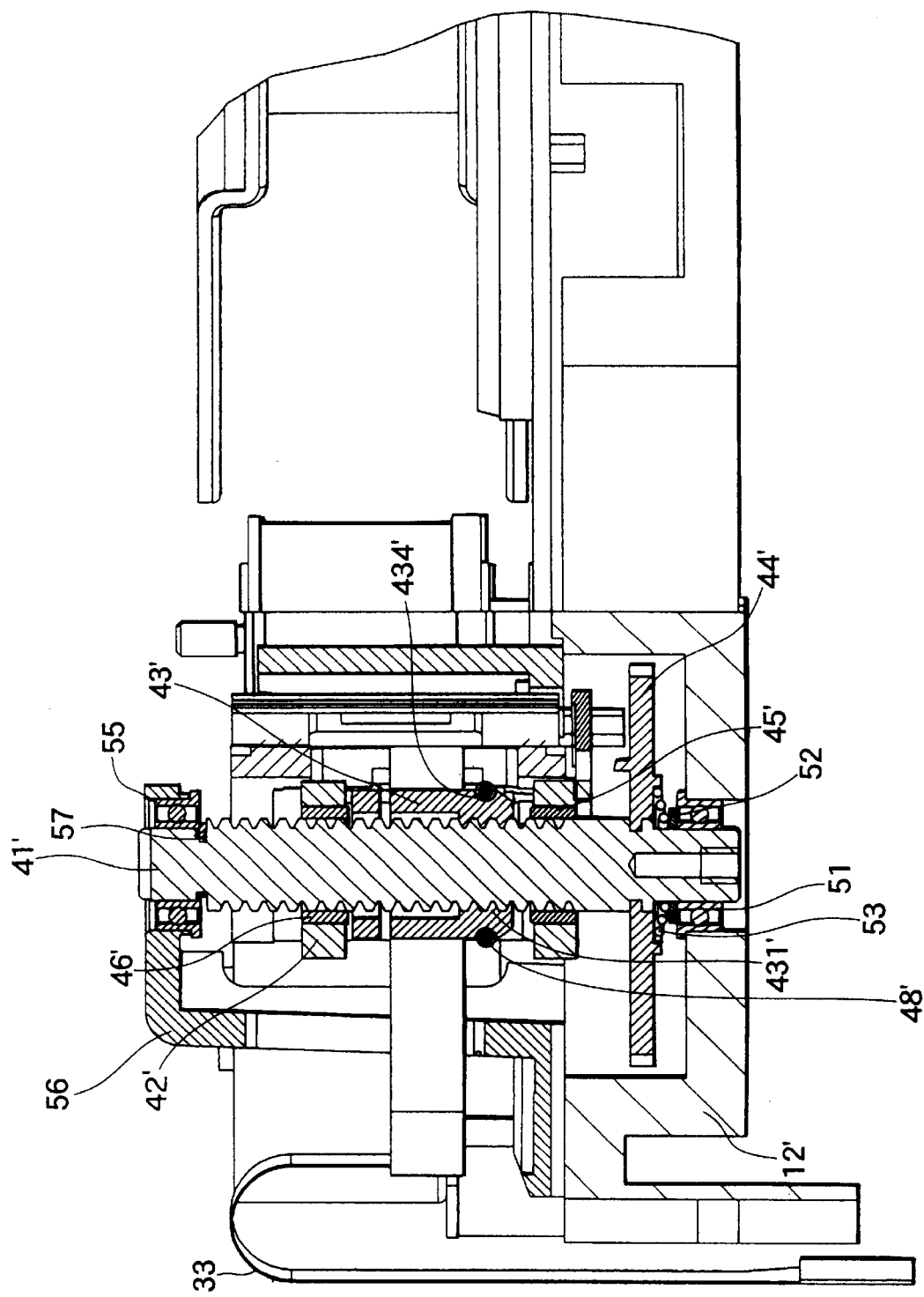
FIG. 6 is a sectional view taken substantially along the lines I—I of FIG. 1.

Referring to FIGS. 2 through 6, the conventional magnetic tape head actuator assembly 20' is described in more detail. FIG. 2 is a perspective view showing an appearance of the magnetic tape head actuator assembly 20'. FIG. 3 is an exploded perspective view showing the magnetic tape head actuator assembly 20' of FIG. 2 in a state where a tape head assembly 30 and a head sending mechanism 40' are detached from each other. FIG. 4 is an exploded perspective view showing the magnetic tape head actuator assembly 20' of FIG. 3 in a state where the head sending mechanism 40' is partly taken apart. FIG. 5 is an exploded perspective view showing the magnetic tape head actuator assembly 20' of FIG. 4 in a state where the head sending mechanism 40' is completely taken apart. FIG. 6 is a sectional view taken substantially along the lines I—I of FIG. 1.

As shown in FIG. 3, the magnetic tape head actuator assembly 20' comprises the tape head assembly (which may be merely called "head assembly") 30 and the head sending assembly 40'. The tape head assembly 30 comprises a magnetic head (which may be merely a head) 31 extending in an up and down direction, a head holder 32 for holding the magnetic head 31, and a couple of flexible printed circuits (FPCs) 33 for electrically connecting between the magnetic head and an outer circuit (not shown).

The head holder 32 comprises a head mounting portion 321 on which the magnetic head 31 is mounted and a couple of flanges 322 which extend in a direction perpendicular to the head mounting portion 321 from both sides at the upper end of the head mounting portion 321. Each of the flanges 322 provides a hole 322a for receiving a screw 34. The screw 34 screws the tape head assembly 30 to the head sending mechanism 40' through the hole 322a. The head mounting portion 321 provides a opening window 321a at the middle thereof. Ends of the couple of the flexible printed circuits (FPCs) 33 are electrically connected to the magnetic head 31 through the opening window 321a.

On the other hand, the head sending mechanism 40' comprises a lead screw (or a shaft) 41' having a rotation axis O and an external thread 41'a, a rectangular frame-shaped head lift 42' having an opening 42'a at a middle portion thereof for holding the tape head assembly 30 to move it up and down, a split nut (which may be merely called "nut") 43' located in the opening 42'a of the head lift 42' and fixed to the head lift 42' and having internal thread 431' (see FIG. 6) engaging the lead screw 41', and a lead screw gear 44' fixed to the lower end portion of the lead screw 41' for rotating the lead screw 41' around the rotation axis O by driven with another driving means (not shown).

According as the lead screw 41' rotates around the rotation axis O, the split nut 43' moves the head lift 42' (up and down) in a direction parallel to the rotation axis O.

As shown in FIGS. 4 and 5, the head lift 42' having a lower end portion 421', a couple of side wall portions 422' and 423' extending upwards from both side of the lower end portion 421', and an upper end portion 424' bridging between the top ends of the side wall portions 422' and 423'. The lower and the upper end potions 421' and 424' provide round openings 421'a and 424'a, respectively, in which bearings 45' and 46' for the lead screw 41' are attached therein. Screw hole 422'a and 423'a are formed in the upper surface of the side wall portions 422' and 423' respectively to engage with the screws 34. Nut holding cavities 422'b and 423b are formed in an upper inner surface of the side wall portions 422' and 423' to hold the split nut 43'. The head lift 42' has a projecting portion 425' projecting outwards from the lower end of the side wall portion 422'. The projecting portion 425' provides a guide receiving gap 425'a for accepting a guide 47'. The guide 47' is attached to a guide rod 50 (see FIG. 1) so as to be allowed sliding up and down along the guide rod 50. The guide 47' is for preventing the head lift 42' from rotating around the rotation axis O.

The split nut 43' has a couple of splits (or slits) 432' (only one shown) which are parallel to the rotation axis O and which are separated by 180 degrees each other in a circumferential direction. The split nut 43' further has a couple of projections 433'. The projections 433' are put into the nut holding cavities 422'b and 423b of the side wall portion 422' and 423'. Thus, the split nut 43' that its internal thread 431' engages with the external thread 41'a of the lead screw 41' moves the head lift 42' up and down along the rotation axis O of the lead screw 41' according to the rotation of the lead screw 41'.

The split nut 43' further has an annular channel 434' formed in an outer peripheral surface. A doughnut shaped spring (ring shaped spring) 48' is located in the annular channel 434'. The doughnut spring 48' is a special coil spring formed into a doughnut shape. The doughnut spring 48' applies pressing power facing towards its inside to the split nut 43'. The split nut 43' further provides a ring shaped space 435' perpendicular to the rotation axis O to reduce amount of deformation thereof.

In this structure, the head lift 42' and the head assembly 30 attached to the head lift 42' move up and down along the rotation axis O in response to the rotation of the screw 41' when the lead screw 41' of the actuator assembly 20' (the head sending mechanism 40') rotates clockwise or counter-clockwise.

In addition, the combination of the split nut 43' and the doughnut spring 48' serves as a backlash eliminating mechanism (or a wobble prevention mechanism) for eliminating backlash between the lead screw 41' and the split nut 43' to preventing the actuator assembly 20' from wobbling. That is, the doughnut spring 48' elastically deforms the split nut 43' having the splits (or slits) 432' toward its center and thrusts the split nut 43' against the lead screw 41' to prevent the lead screw 41' wobbling when the lead screw 41' is rotated.

Furthermore, the split nut 43' is easy to receive mechanical shock and this brings the wobble in the actuator assembly. A shock absorbing sleeve for reducing the mechanical shock is disclosed in above mentioned U.S. Pat. No. 5,793,574. The shock absorbing sleeve raises tolerance for the wobble based on the mechanical shock, abrasion, or mechanical allowance. It must be noticed that the shock absorbing sleeve is for the magnetic tape head actuator assembly including the backlash eliminating mechanism comprising the combination of the split nut and the doughnut spring.

As understood from FIG. 6, the lower end portion of the lead screw 41' is rotatably fixed to the chassis 12 through a bearing 51. The lead screw gear 44' is placed on the bearing 51 through a washer 52 and a lift spring 53. The upper end portion of the lead screw 41' is rotatably fixed to a bearing holder 56 through another bearing 55. The bearing holder 56 is mounted on the chassis 12'. In addition, an E-shaped ring 57 is placed between the bearing 55 and the external thread of the lead screw 41'.

As mentioned above, the conventional magnetic tape head actuator assembly includes the combination of the split nut 43' and the doughnut spring 48' as the backlash eliminating mechanism. However, the split nut 43' and the doughnut spring 48' are expensive because they have special shapes (or structures). Furthermore, it is difficult to obtain a fixed thrust power from the split nut 43' to the lead screw 41' because there is manufacturing variation in elasticity of the split nut 43' and the doughnut spring 48'.

In addition, the bearing 45' for the lead screw 41', the guide 47' for preventing the head lift 42' from rotating and the split nut 43' are formed as separate parts in the conventional head sending mechanism 40'. Therefore, the conventional head sending mechanism 40' is costly and is difficult to be assembled.

Referring to FIGS. 7 through 12, the description will proceed to a magnetic tape head actuator assembly according to a preferred embodiment of this invention.

Figure 7:
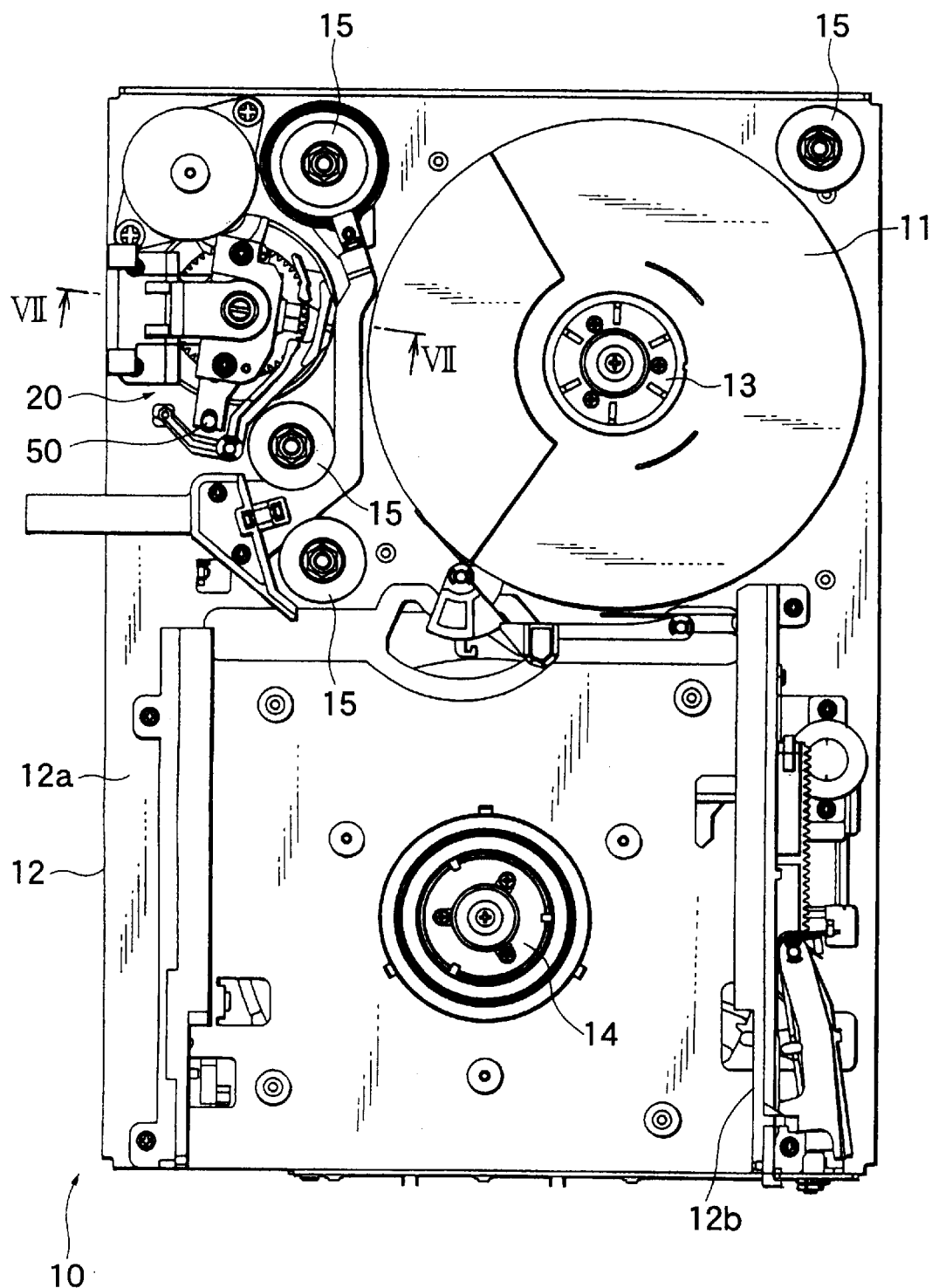
FIG. 7 is a plane view showing the tape drive with a magnetic tape head actuator assembly according to an embodiment of this invention in a state where a top cover is removed.

At first, referring to FIG. 7, the description about a tape drive including the magnetic tape head actuator assembly of the preferred embodiment. FIG. 7 is a plane view showing the tape drive 10 from which a top cover is removed.

The tape drive 10 is for receiving a tape cartridge (not shown) and contains a take-up reel 11 therein. The take-up reel 11 may be called a spool. The tape drive 10 comprises a rectangular parallelepiped housing (or chassis) 12 having a common base 12a. First and second spindle motors (or reel motors) 13 and 14 are mounted on the base 12a. The spool (or the take-up reel) 11 is permanently fixed to the first spindle motor 13. The spool 11 has dimensions designed to accept a relatively high speed streaming magnetic tape (not shown). The second spindle motor (reel motor) 14 is adapted to accept a removable tape cartridge. The removable tape cartridge is manually or automatically inserted into the drive 10 along a direction shown by an arrow A via a slot 12b formed on the housing 12 of the drive 10.

Upon insertion of the tape cartridge into the slot 12b, the cartridge engages with the second spindle motor (reel motor) 14. Prior to rotation of the first and the second spindle motors 13 and 14, the tape cartridge is connected to the permanently mounted spool (the take-up reel) 11 by means of a mechanical buckling mechanism (not shown). A number of rollers (guide rollers) 15 positioned, as intermediates, between the tape cartridge and the permanent spool 11 guide the magnetic tape as it traverses at relatively high speeds back and forth between the tape cartridge and the permanently mounted spool 11.

In addition, the housing 12 comprises a pressed sheet metal chassis which is made of magnetic material of a metal system.

The tape drive 10 further comprises a magnetic tape head actuator assembly (which may be merely called an actuator assembly) 20 which is located between a take-up spool 11 and a tape cartridge on a tape path defined by the plurality of rollers 15. During operation, a magnetic tape flows forward and backward between the take-up spool 11 and the tape cartridge and is closely adjacent to the magnetic tape head actuator assembly 20 while the magnetic tape flows on the defined tape path.

Figure 8:
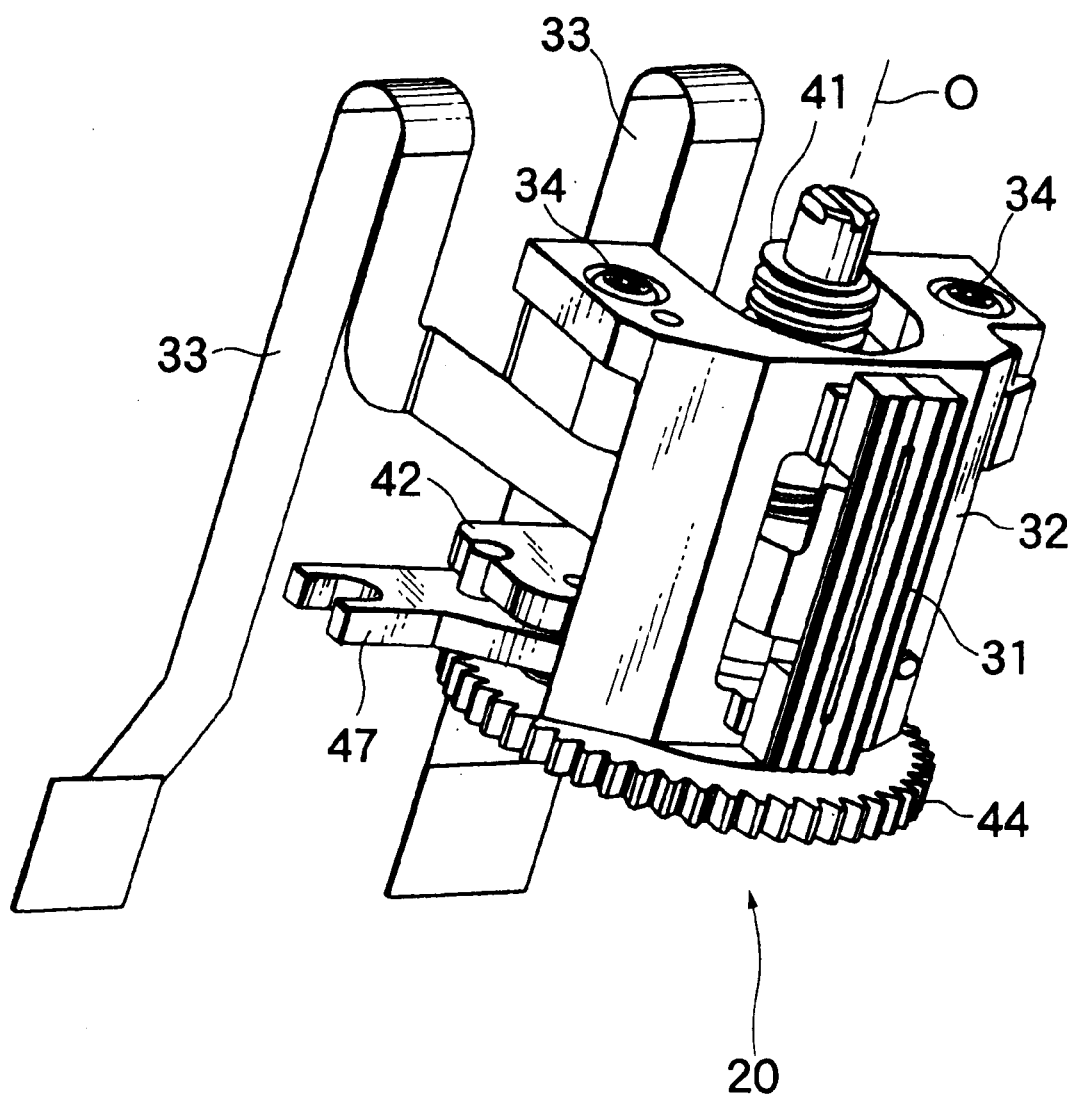
FIG. 8 is a perspective view showing an appearance of the magnetic tape head actuator assembly according to the embodiment of this invention.
Figure 9:
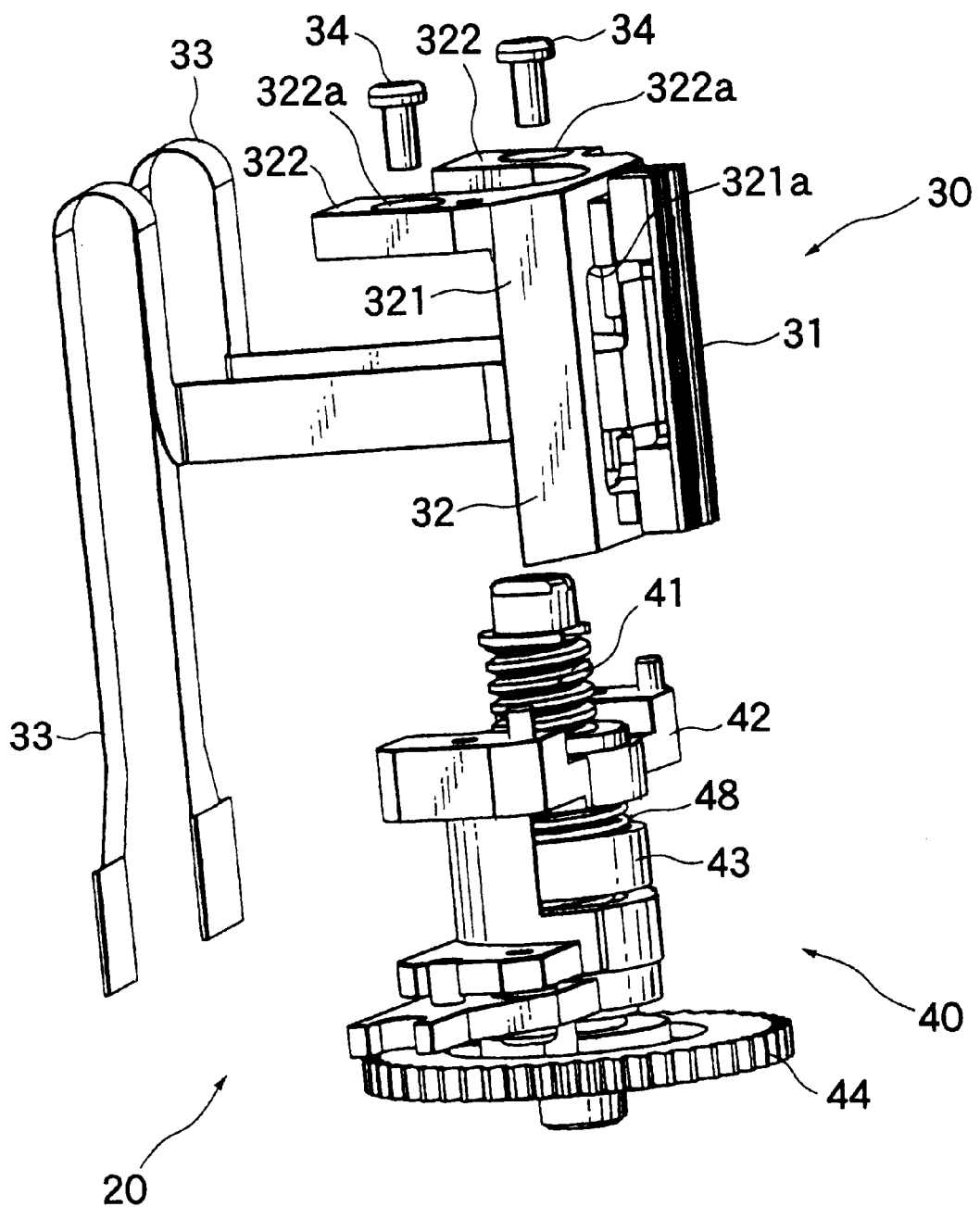
FIG. 9 is an exploded perspective view showing the magnetic tape head actuator assembly of FIG. 8 in a state where a tape head assembly and a head sending mechanism are apart from each other.
Figure 10:
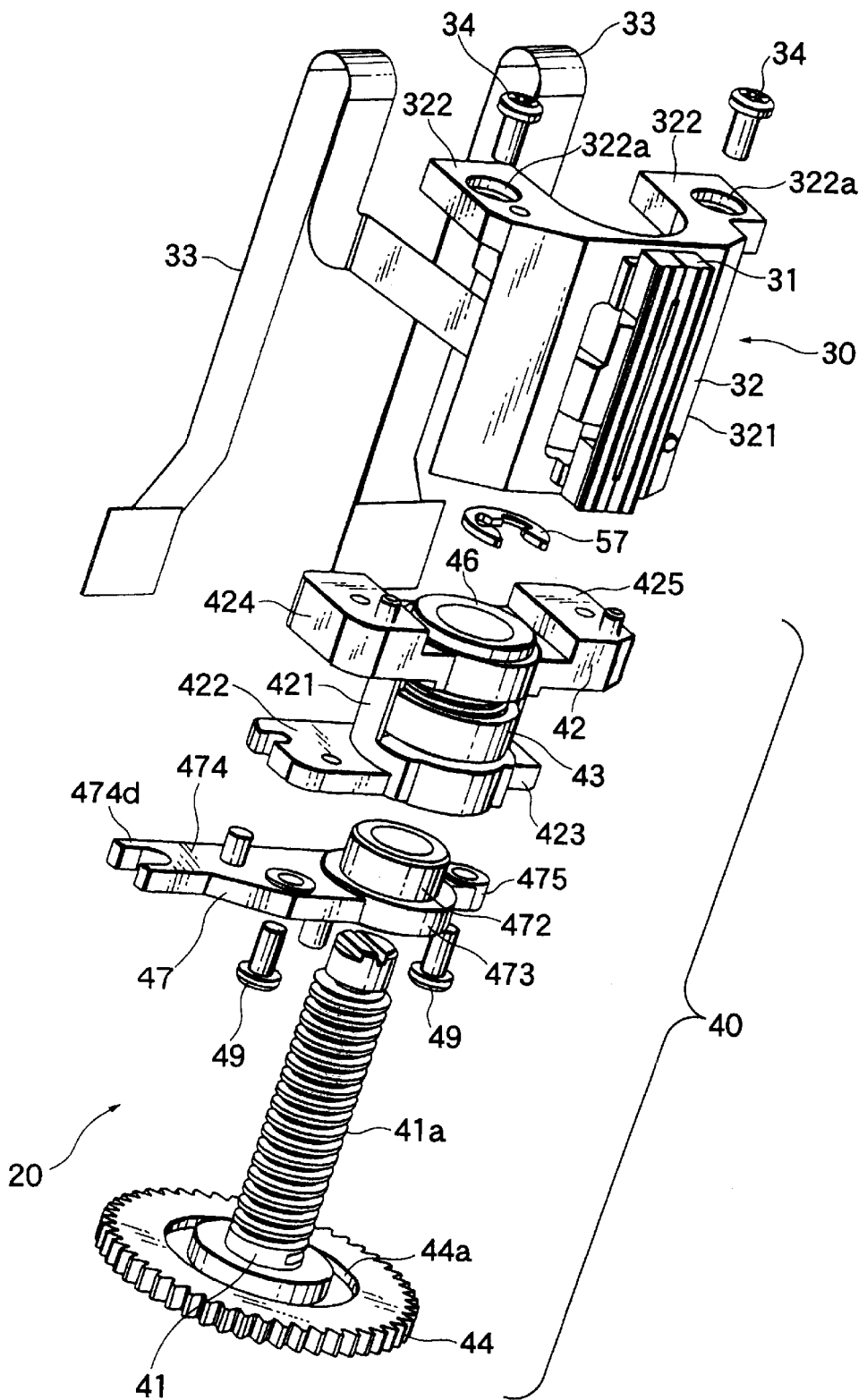
FIG. 10 is an exploded perspective view showing the magnetic tape head actuator assembly of FIG. 9 in a state where the head sending mechanism is partly taken apart.
Figure 11:
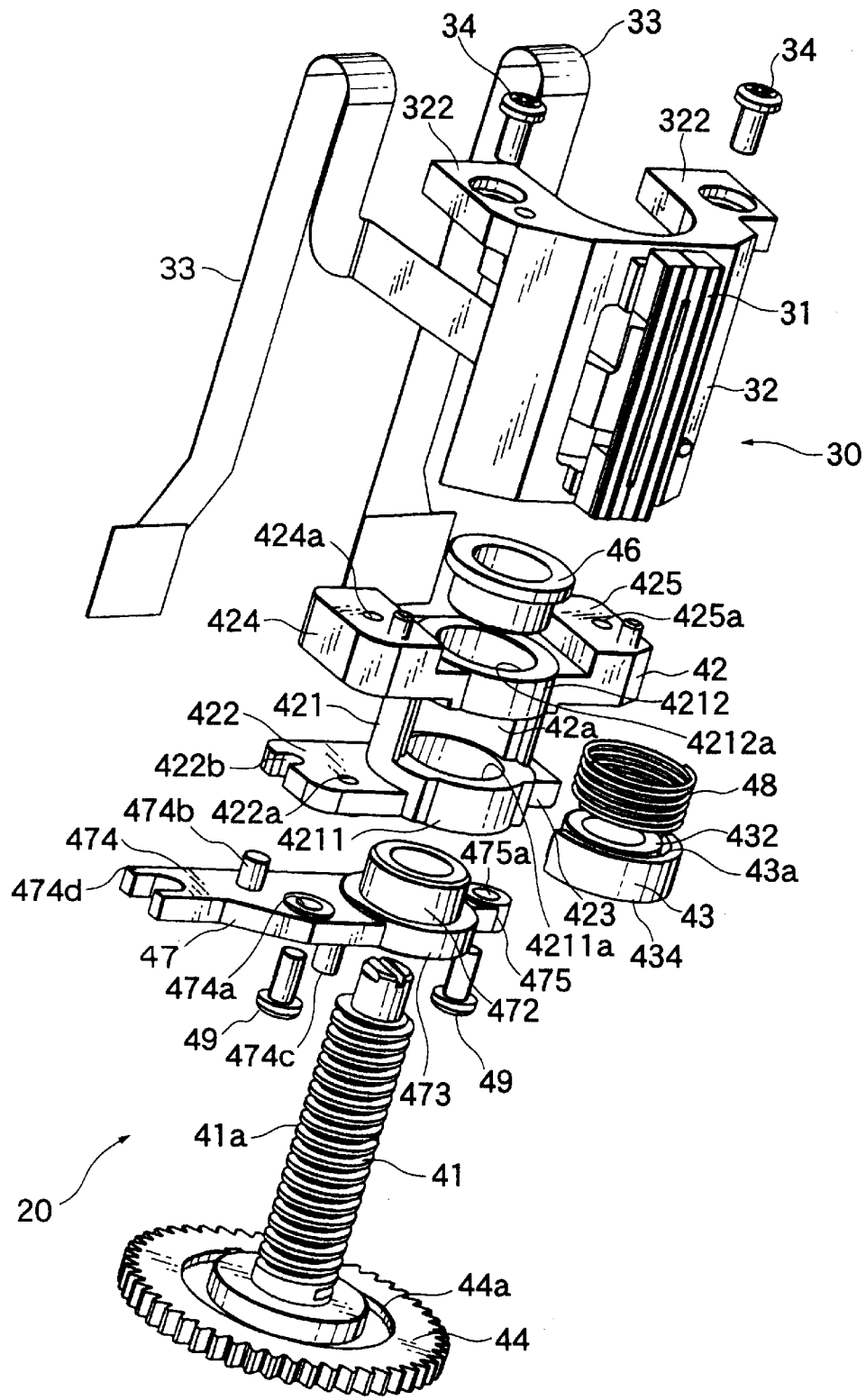
FIG. 11 is an exploded perspective view showing the magnetic tape head actuator assembly of FIG. 9 in a state where the head sending mechanism is completely taken apart.
Figure 12:
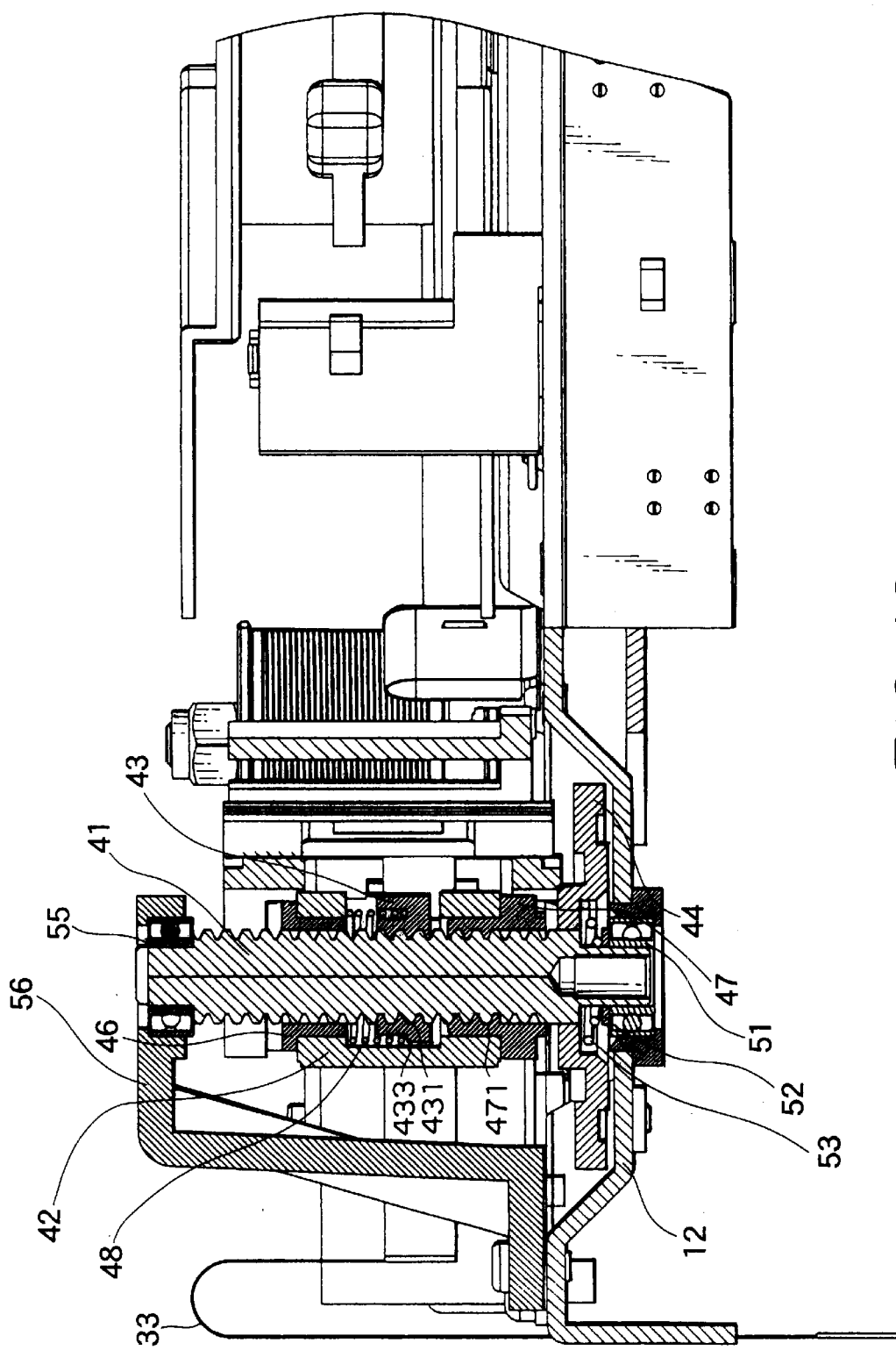
FIG. 12 is a sectional view taken substantially along the lines VII—VII of FIG. 7.

Referring to FIGS. 8 through 12, the magnetic tape head actuator assembly 20 is described in more detail. FIG. 8 is a perspective view showing an appearance of the magnetic tape head actuator assembly 20. FIG. 9 is an exploded perspective view showing the magnetic tape head actuator assembly 20 of FIG. 8 in a state where a tape head assembly 30 and a head sending mechanism 40 are detached from each other. FIG. 10 is an exploded perspective view showing the magnetic tape head actuator assembly 20 of FIG. 9 in a state where the head sending mechanism 40 is partly taken apart. FIG. 11 is an exploded perspective view showing the magnetic tape head actuator assembly 20 of FIG. 9 in a state where the head sending mechanism 40 is completely taken apart. FIG. 12 is a sectional view taken substantially along the lines VII—VII of FIG. 7.

As shown in FIG. 9, the magnetic tape head actuator assembly 20 comprises the tape head assembly (which may be merely called "head assembly") 30 and the head sending assembly 40. The tape head assembly 30 comprises a magnetic head (which may be merely a head) 31 extending in an up and down direction, a head holder 32 for holding the magnetic head 31, and a couple of flexible printed circuits (FPCs) 33 for electrically connecting between the magnetic head and an outer circuit (not shown).

The head holder 32 comprises a head mounting portion 321 on which the magnetic head 31 is mounted and a couple of flanges 322 which extend in a direction perpendicular to the head mounting portion 321 from both sides at the upper end of the head mounting portion 321. Each of the flanges 322 provides a hole 322a for receiving a screw 34. The screw 34 screws the tape head assembly 30 to the head sending mechanism 40 through the hole 322a. The head mounting portion 321 provides a opening window 321a at the middle thereof. Ends of the couple of the flexible printed circuits (FPCs) 33 are electrically connected to the magnetic head 31 through the opening window 321a.

On the other hand, as shown in FIGS. 10 and 11, the head sending mechanism 40 comprises a lead screw (or a shaft) 41 having a rotation axis O and an external thread 41a, an I-shaped hollow head lift 42 having an middle space 42a defined by half cylinder portion at the middle thereof for holding the tape head assembly 30 to move it up and down, a preload bushing 43 placed in the middle space 42a and having an internal thread 431 (see FIG. 12) engaging the lead screw 41, a lead screw gear 44 fixed to the lower end portion of the lead screw 41 for rotating the lead screw 41 around the rotation axis O by driven with another driving means (not shown), and a head guide 47 attached to the head lift 42 and having an internal thread 471 (see FIG. 12) engaging the lead screw 41.

According as the lead screw 41 rotates around the rotation axis O, the head guide 47 cooperates with the preload bushing 43 and moves the head lift 42 (up and down) in a direction parallel to the rotation axis O.

The head lift 42 having a cylinder portion 421 provides a through hole from a lower end to a upper end thereof to freely receive the lead screw 41. The cylinder portion 421 provides the middle space 42a which partly coincides with the through hole of the cylinder portion 421 and which is open to the outside of the cylinder portion 421. The middle space 42a is receiving the preload busing 43. The head lift further has a couple of leg portions 422 and 423 extending toward both sides at a lower end portion of the cylinder portion 421, and a couple of arm portions 424 and 425 extending toward both sides at an upper end portion of the cylinder portion 421. The cylinder portion 421 has annular openings 4211a and 4212a at a lower portion 4211 and an upper portion 4212 respectively. A hollow top portion 472 of the head guide 47 and a radial bearing 46 for the lead screw 41 are placed in the annular openings 4211a and 4212a respectively. The internal thread 471 is formed in the hollow top portion 472. Screw holes 424a and 425a are formed in the arm portion 424 and 425 at their top surfaces respectively.

The head guide 47 having the hollow top portion 472 with the internal thread 471, a hollow trunk portion 473 adjoining the lower part of the hollow top portion 472 and contacting with the bottom end 4211 of the head lift 42, and a couple of arm portions 474 and 475 extending toward both sides from the hollow trunk portion 473. The hollow trunk portion 473 serves as a radial bearing for the lead screw 41.

The arm portions 474 and 475 of the head guide 47 provide holes 474a and 475a for the screws 49, respectively. The screws 49 engage the internal threads 422a (only one shown) of the leg portions 422 and 423 through the holes 474a and 475a and screw the head guide 47 to the head lift 42.

In addition, the arm portion 474 of the head guide 47 is longer than the arm portion 475. The arm portion 474 provides a first solid cylindrical projection 474b which protrudes upwards and engages an engaging cavity 422b formed at an end of the leg portion 422. Thus, the head guide 47 is positioned against the head lift 42. Furthermore, the arm portion 474 has a second solid cylindrical projection 474c which protrudes downward and is inserted in an annular channel 44a formed in the lead screw gear 44. The arm portion 474 provides a C-shaped guide portion 474d at an end thereof. The guide portion 474d is attached to the guide rod 50 (see FIG. 7) so as to slide freely in an up and down direction. The guide portion 474d is for preventing the head lift 42 from rotating.

Thus, the head guide 47 comprises one body including the hollow top portion 472, the hollow trunk portion 473 and the guide portion 474d which corresponds to the split nut 43', the bearing 45' and the guide 47' of the conventional head sending mechanism 40' respectively. That is, the head guide 47 is formed as a single part and works as three parts of the conventional head sending mechanism 40'. Thus, costs and the number of assembly processes are reduced by decrease of the number of the parts.

The preload bushing 43 has a hollow cylinder portion 432 having the internal thread 431, a annular supporting portion 433 projecting outward from the hollow cylinder portion 432 at lower end portion of the hollow cylinder potion 432, a half cylinder portion 434 extends upward from a half of an outer periphery of the annular supporting portion 433. A half annular channel 43a is formed between the hollow cylinder portion 432 and the half cylinder portion 434. The preload bushing 43 has the shape that it is permitted to move up and down along an imaginary axis corresponding the rotation axis O in the middle space 42a of the head lift 42 and not to rotate around the imaginary axis.

As illustrated in FIG. 12, a preload spring 48 is and partially inserted in the half annular channel 43a and compressed and placed between the preload bussing 43 and a bottom surface of the upper portion 4212 of the head lift 42. That is, the preload spring 48 is a compressed coil spring. The preload spring 48 always presses the preload bushing 43 and the head lift 42 in opposite directions parallel to the rotation axis O of the lead screw 41. That is, the preload spring 48 presses the preload bussing 43 downward and presses the head lift 42 upward along the rotation axis O. Because the head guide 47 is fixed to the head lift 42, it receives upward force parallel to the rotation axis O of the lead screw 41 from the head lift 42 at all times.

A combination of preload bushing 43 and the preload spring 48 serves as a backlash eliminating mechanism for eliminating backlash of the actuator assembly 20. In other words, the combination serves as a wobble prevention mechanism for preventing the actuator assembly 20 from wobbling.

Detailed explanation will be made about the backlash eliminating mechanism soon. When the actuator assembly 20 is assembled, the preload bushing 43 and the preload spring 48 are located in the middle space 42a of the head lift while the head guide 47 is fixed to the lower end potion of the head lift 42. In this state, the preload bushing 43 is pushed by the preload spring 48 against the lower portion 4211 of the head lift 42. In addition, the internal thread 431 of the preload bushing 43 has a phase different from that of the internal thread 471 of the head guide 47. For example, there is a phase difference of 180 degrees between the internal threads 431 and 437.

In the above-mentioned state, the lead screw 41 is inserted into the head guide 47, the preload 43 and radial bearing 46 in this order as shown in FIG. 12. In this time, the lead screw 41 pushes up the preload bushing 43 against the restitution of the preload spring 48 because the phase difference between the internal threads 431 and 437 prevent the lead screw 41 going into the preload busing 43. If the phase difference is equal to 180 degrees, the preload bushing 43 is apart from the lower portion 4211 of the head lift 42 by a half pitch of the external thread of the lead screw 41. Thereafter, the external thread of the lead screw 41 engages the internal thread 431 of the preload bussing 43 and the lead screw 41 goes into the preload bushing 43. Additionally, FIG. 12 shows a case where the phase difference is approximately equal to 360 degrees and smaller than 360 degrees. In this case, the interval between the preload bush 43 and the lower portion 4211 is approximately equal to a pitch of the external thread of the lead screw 41.

Because the preload spring 48 is compressed as mentioned above, the preload bushing 43 receives the upward force parallel to the rotation axis O of the lead screw 41 while the head guide 47 receives the downward force parallel to the rotation axis O of the lead screw 41. Consequently, upper flanks of the internal thread 431 of the preload bushing 43 are thrust against upper flanks of the external thread 41a of the lead screw 41 while lower flanks of the internal thread 471 of the head guide 47 are thrust against lower flanks of the external thread 41a of the lead screw 41. This state is kept in a case where the lead screw 41 is rotated clockwise or counterclockwise and where the head lift 42 moves up or down along the rotation axis O of the lead screw 41. Thus, the wobble of the head lift 42 against the lead screw 41 is prevented when head lift 42 is moved by rotation of the lead screw 41.

The preload bushing 43 and the preload spring 48 are inexpensive in comparison with the split nut 43' and the doughnut spring 48' for the backlash eliminating mechanism of the conventional head sending mechanism, because they have comparatively commonplace shapes (or structures). In addition, it is easy to obtain fixed force given between the head lift 42 and the lead screw 41 along the rotation axis because the preload bushing 43 and the preload spring 48 can be manufactured with a little variation in elasticity.

As understood from FIG. 12, the lower end potion of the lead screw 41 is rotatably fixed to the chassis 12 through the bearing 51. The lead screw gear 44 is located on the bearing 51 through the washer 52 and the lift spring 53. The upper end portion of the lead screw 41 is rotatably fixed to the bearing holder 56 through the bearing 55. The bearing holder 56 is fixed on the chassis 12. In addition, the E-shaped ring 57 (see FIG. 10) is placed between the bearing 55 and the external thread 41a of the lead screw 41.

While this invention has thus far been described in conjunction with the preferred embodiment thereof, it will readily be possible for those skilled in the art to put this invention into practice in various other manners. For example, this invention may apply to various products or mechanisms each of which has a lead screw, such as a pickup sending mechanism of a disk or disc drive. In addition, a press fit method or so may be used to attach the head guide with the head lift.

What is claimed is:

1. A head sending mechanism for sending a head assembly up and down along a predetermined axis extending in an up and down direction, said head sending mechanism comprising:

a lead screw with an external thread having a rotation axis corresponding to said predetermined axis, a head lift on which said head assembly is mounted, providing a through hole from a lower side to an upper side thereof in the up and down direction for freely receiving said lead screw, and providing a middle space which is open to the outside of said head lift and partly coincides with said through hole at the middle thereof in the up and down direction, a head guide fixed at said lower side of said head lift and having a first internal thread for engaging with said external thread of said lead screw to move said head lift up and down along said predetermined axis according to rotation of said lead screw around said rotation axis, a preload bushing located in said middle space of said head lift so as to be out of contact with said head lift in the up and down direction and not to rotate around said rotation axis, said preload bushing having a second internal thread for engaging with said external thread of said lead screw, a compressed coil spring located between said head lift and said preload bushing in said middle space of said head lift for pressing said head lift against said preload bushing along said predetermined axis to force said preload bushing toward said head guide.

2. A head sending mechanism as claimed in claim 1, wherein said first internal thread of said head guide is different from said second internal thread of said preload bushing in phase.

3. A head sending mechanism as claimed in claim 1, wherein said head guide further comprises a radial bearing portion for rotatably supporting said lead screw and a guide portion for preventing said head guide from rotating.

4. A head sending mechanism as claimed in claim 1, wherein said head guide is screwed to said head lift.

5. A backlash eliminating mechanism for use in a head sending mechanism for sending a head assembly up and down along a predetermined axis extending in an up and down direction, said head sending mechanism comprising:

a lead screw with an external thread having a rotation axis corresponding to said predetermined axis, a head lift on which said head assembly is mounted, providing a through hole from a lower side to an upper side thereof in the up and down direction for freely receiving said lead screw, and an up-down moving member fixed at said lower side of said head lift and having a first internal thread for engaging with said external thread of said lead screw to move said head lift up and down along said predetermined axis according to rotation of said lead screw around said rotation axis, wherein said backlash eliminating mechanism comprises a pressing means related to both of said lead screw and head lift for pressing said head lift against said lead screw in a direction along the predetermined axis, wherein said head lift further provides a middle space which is open to the outside of said head lift and partly coincides with said through hole at the middle thereof in said up and down direction, and wherein said pressing means comprises:
a preload bushing located in said middle space of said head lift so as to be out of contact with said head lift in the up and down direction and not to rotate around said rotation axis, said preload bushing having a second internal thread for engaging with said external thread of said lead screw, and a compressed coil spring located between said head lift and said preload bushing in said middle space of said head lift for pressing said head lift against said preload bushing along said predetermined axis to force said preload bushing toward said up-down moving member.

6. A backlash eliminating mechanism as claimed in claim 5, wherein said first internal thread of said up-down moving member is different from said second internal thread of said preload bushing in phase.

7. An actuator assembly for moving a mounted body along a predetermined axis in an up and down direction by rotating a lead screw with an external thread, said lead screw having a rotation axis corresponding to said predetermined axis, said actuator assembly comprising:

a mounting member on which said mounted body is mounted, providing a through hole from a lower side and an upper side thereof in the up and down direction for freely receiving said lead screw, a moving member fixed at said lower side of said mounting member and having a first internal thread for engaging with said external thread of said lead screw to move said mounting member up and down along said predetermined axis according to rotation of said lead screw around said rotation axis, and a backlash eliminating mechanism related to both of said lead screw and said mounting member for pressing said mounting member against said lead screw in a direction along the predetermined axis, wherein said mounting member further provides a middle space which is open to the outside of said mounting member and partly coincides with said through hole at the middle thereof in said up and down direction, and wherein said backlash eliminating mechanism comprises:
a preload bushing located in said middle space of said mounting member so as to be out of contact with said mounting member in the up and down direction and not to rotate around said rotation axis, said preload bushing having a second internal thread for engaging with said external thread of said lead screw, a compressed coil spring located between said moving member and said preload bushing in said middle space of said mounting member for pressing said mounting member against said preload bushing along said predetermined axis to force said preload bushing toward said moving member.

8. An actuator assembly as claimed in claim 7, wherein said first internal thread of said moving member is different from said second internal thread of said preload bushing in phase.

9. An actuator assembly as claimed in claim 7, wherein said moving member further comprises a radial bearing portion for rotatably supporting said lead screw and a guide portion for preventing said moving member from rotating.

10. An actuator assembly as claimed in claim 7, wherein said moving member is screwed to said mounting member.

11. An actuator assembly as claimed in claim 7, wherein said moving member is force fittedly fixed to said mounting member.

12. An actuator assembly as claimed in claim 7, wherein said mounted body comprises a head assembly.

13. An actuator assembly as claimed in claim 7, wherein said mounted body comprises a pickup.

* * * * *